Nov. 23, 1954 A. L. CAUSLEY 2,695,231
PROCESS OF MAKING FLUID-PERMEABLE ARTICLE
Original Filed April 16, 1949
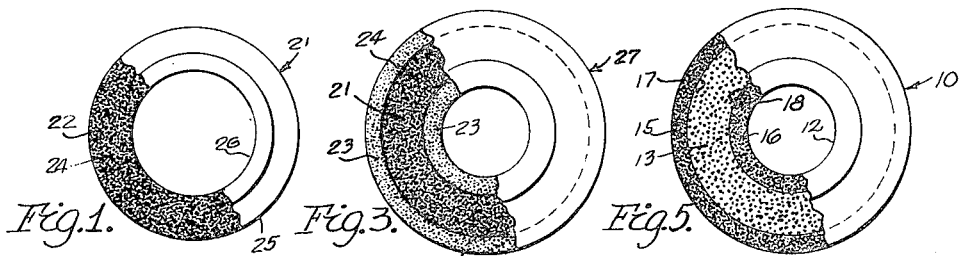
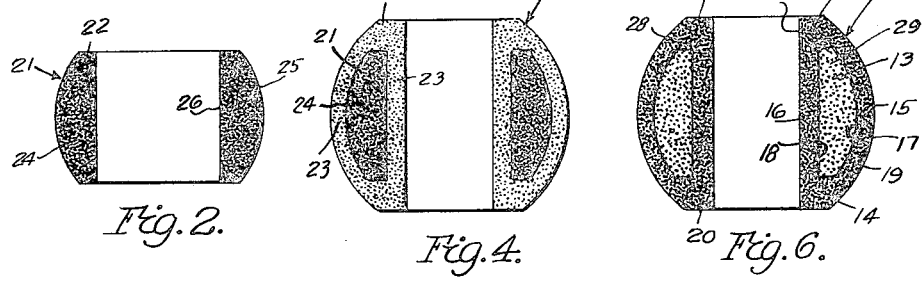
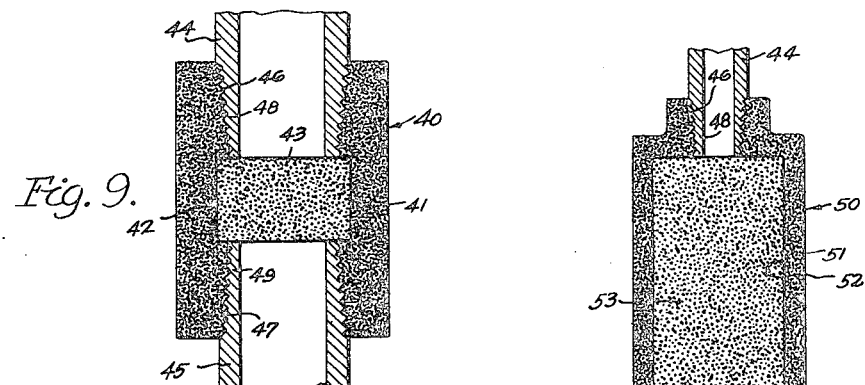
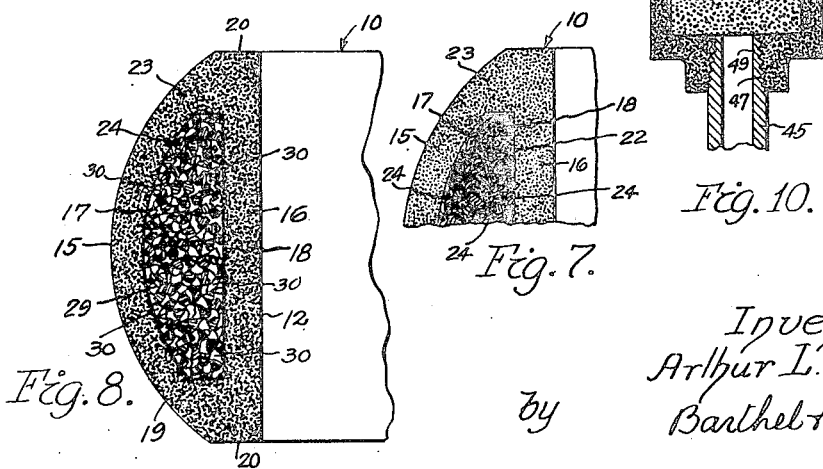
Inventor
Arthur L. Causley
by Barthel + Bugbee
Attys United States Patent Office 2,695,231
Patented Nov. 23, 1954

2,695,231

PROCESS OF MAKING FLUID-PERMEABLE ARTICLE

Arthur L. Causley, Detroit, Mich., assignor to Michigan Powdered Metal Products Co., Inc., Northville, Mich., a corporation of Michigan Original application April 16, 1949, Serial No. 87,975. Divided and this application March 31, 1950, Serial No. 153,201

4 Claims. (Cl. 75—208)

This invention relates to articles of porous material such as powdered metal and, in particular, to bearings, filters, barriers or the like having permeable chambers or passageways of honeycomb or cellular structure therein, and processes for making the same.

One object of this invention is to provide a process of making a bearing of porous material having a lubricant reservoir within the bearing wall including a permeable cellular or honeycomb structure of sponge-like appearance for holding a reserve supply of oil other than that normally present within the pores of the bearing.

Another object is to provide a process of making a bearing of porous material having a permeable cellular or honeycomb space within the bearing walls with a coarser porosity than the porosity of the bearing walls, so that this cellular space forms a lubricant reservoir having a larger lubricant capacity than the same space would possess if of the finer porosity of the bearing wall, and which also provides a structurally stronger bearing than one having a hollow lubricant reservoir without such cellular structure.

Another object is to provide a process of making a bearing of porous material having a permeable cellular or honeycomb lubricant reservoir of sponge-like appearance in the bearing wall by embedding a core composed of a mixture of coarser particles of infiltratable and non-infiltratable material in a bearing body of powdered material which, after compressing and sintering, possesses a relatively coarse honeycomb or cellular lubricant reservoir structure left by the particles of infiltratable material after they have infiltrated into the bearing wall.

Another object is to provide a process of making a permeable article such as a porous barrier, dashpot or similar device by embedding a composite core in a body of powdered material, such as powdered metal, the composite core being composed of a mixture of relatively coarser particles of infiltratable and non-infiltratable material, the assembly thus produced being compressed and sintered, with the result that a relatively coarse filter or permeable barrier structure of sponge-like appearance is formed where the coarser particles of infiltratable material infiltrated into the wall of the body, this permeable structure being firmly united to the body by the sintering operation.

This is a division of my co-pending application Serial No. 87,975, filed April 16, 1949, for Fluid Permeable Article and Process of Making the Same.

In the drawing:

Figure 1 is a top plan view, partly in central horizontal section, of a composite core used in making a permeable article, such as a bearing with a cellular lubricant reservoir of sponge-like appearance, according to the present invention;

Figure 2 is a central vertical section through the core shown in Figure 1;

Figure 3 is a top plan view, partly in central horizontal section, of a core and body assembly of compressed powdered material with the core of Figures 1 and 2 embedded therein prior to sintering;

Figure 4 is a central vertical section through the assembly shown in Figure 3;

Figure 5 is a top plan view, partly in central horizontal section, of a permeable article, such as a bearing, formed by sintering the assembly of Figures 3 and 4;

Figure 6 is a central vertical section through the permeable article shown in Figure 5;

Figure 7 is an enlarged fragmentary vertical section similar to a portion of Figure 6, but showing in more detail the core structure before sintering;

Figure 8 is an enlarged fragmentary vertical section similar to Figure 7, but showing the cellular reservoir structure of sponge-like appearance after sintering;

Figure 9 is a central longitudinal section through a modified permeable article having a permeable barrier formed by the process of the present invention; and Figure 10 is a central longitudinal section through a further modified permeable article formed by the same process.

Bearings of porous material made by compressing and sintering powdered material, such as powdered iron or bronze, have been hitherto developed for providing self-contained lubrication for the bearing over long periods of time. These bearings hitherto known and commercially available have often proved inadequate in service due to the limited quantity of lubricant contained in the pores of the bearing wall. In the co-pending application of John Haller, Serial No. 81,274 filed March 14, 1949 for Porous Bearing with Lubricant Reservoir Therein, which on January 13, 1953 became U. S. Patent 2,625,452, there is shown a bearing of porous material, such as powdered iron, having a reservoir within the bearing wall for holding a reserve supply of oil. This reservoir was provided by the use of a core of infiltratable material, such as a copper-zinc alloy, embedded within the bearing wall during molding. When this assembly was sintered, the core metal melted and infiltrated into the bearing metal, leaving a hollow lubricant chamber or reservoir within the bearing wall.

In order to provide a stronger bearing capable of heavy duty service under increased loads, the previously-mentioned Haller reservoir bearing was improved as shown in the co-pending Blood application, Serial No. 82,243, filed March 18, 1949, for Porous Chambered Bearing and Process of Making the Same, which on February 10, 1953, became U. S. Patent 2,628,138, by forming the core in a helical shape resembling a helical spring of infiltratable material. The latter, upon sintering, disappeared, as before, into the powdered iron constituting the bearing wall, and leaving a lubricant reservoir in the form of a helical passageway. This helical passageway provided a bearing lubricant reservoir of large capacity but yet having increased structural strength well adapting it to heavy duty operation because of the reinforcements provided by the metal between the various convolutions of the passageway. In both the foregoing bearings, however, the filling of the reservoir with lubricant was occasionally found to be difficult due to the formation of a bubble of air in the reservoir. This air is not easily sucked out through the pores of the bearing wall under ordinary low vacuum conditions or by immersing the bearing in hot oil and allowing it to cool.

The present invention eliminates these difficulties by providing a porous body of powdered iron in which a core of a mixture of relatively coarser particles of powdered iron disposed in close proximity to one another and infiltratable metal such as a copper-zinc alloy is embedded during molding. Upon sintering this assembly at a temperature above the melting point of the alloy but below the melting point of the iron, the infiltratable metal particles of the core melt and disappear into the bearing wall by infiltration into the pores between the particles thereof, leaving a cellular or honeycomb structure of non-infiltratable iron and of sponge-like appearance, this structure being composed of larger iron particles than the particles of the surrounding bearing wall, the larger iron particles engaging and adhering to one another, these larger iron particles having larger pores therebetween than the smaller iron particles of the surrounding bearing wall. The meanings of the words "infiltratable" and "non-infiltratable" are defined below. When this bearing is heated in a bath of lubricating oil, the lubricating oil is drawn into this honeycomb reservoir structure by capillary attraction without encountering air bubble difficulties. At the same time, the cellular or honeycomb structure of the reservoir strengthens the outer and inner bearing wall portions on opposite sides of the cellular reservoir by providing bridge-like reinforcements extending from particle to particle of the bearing wall. The same filling procedure, of course, also fills the small pores in the wall of the bearing itself, and as rapidly as these are depleted of their oil, more oil flows into them from the cellular reservoir structure provided by the present invention.

The present invention also enables the production of permeable articles, such as filters, liquid or gas barriers, dashpots or the like. The pores may be regulated as to size merely by regulating the size of the particles of infiltratable material. The cellular reservoir structure may be made of any desired shape, such as, for example, in annular form. Such permeable articles are formed by the process of the present invention, the body of the article being formed of powdered material, such as powdered iron, and the permeable element is formed from a mixture of coarser particles of infiltratable material and non-infiltratable material.

Referring to the drawings in detail, Figures 1 to 7 inclusive show a bearing, generally designated 10, according to the present invention, as made by the process of the present invention. This bearing consists of a body 11 of powdered bearing material, such as powdered iron, having the usual bearing bore 12 through it. The bearing 10, however, is provided with a lubricant reservoir 13 located in the bearing wall or body 14 between its outer and inner bearing wall portions 15 and 16 respectively, the latter being provided with the bearing bore 12. The reservoir 13 is in the form of a chamber filled with cellular material of sponge-like appearance which, for convenience, may be of the same material as the bearing wall 14, for example, powdered iron. The chamber 13 is provided with spaced outer and inner wall surfaces 17 and 18 respectively, and the bearing wall 14 itself is provided with an outer surface 19 which may be of any suitable shape, the spherical or partially spherical shape shown in the drawing being adapted to provide a self-aligning bearing. The ends 20 of the bearing 10 may likewise be of any desired shape and are shown as of annular shape.

In forming the bearing 10 according to the process of the present invention, a core, generally designated 21, is first produced, using a mixture of spacing particles 22 of an infiltratable material with cellular structure particles 24 of a non-infiltratable material with respect to the particles 23 of the bearing wall 14 material. The words "infiltratable" and "non-filtratable" as used herein have meanings which follow directly from the meaning of the verb "infiltrate" as defined in Webster's New International Dictionary, Second Edition, Unabridged, G. and C. Merriam Company, 1944, page 1274: "1. To enter or cause to enter by or as by penetrating the pores or interstices of a substance; to filter into or through something." If the bearing wall or body 14 is to be of particles 23 of powdered iron, it is convenient to use for the core 21 a mixture of powdered iron particles as cellular structure particles and powdered copper-zinc alloy particles as spacing particles. The copper-zinc alloy of which these particles are formed may be of a proportionate composition of 85% copper and 15% zinc. In order to provide an adequate capacity for the cellular lubricant reservoir 13, it is desirable to form the infiltratable metal particles 22 of larger diameter than the powdered metal particles 23 of which the bearing body 14 is composed, and it is likewise preferable to use non-infiltratable metal particles 24 which are coarser than the powdered metal particles 23 of the bearing body 14. The non-infiltratable metal particles 24 may be of the same material as the bearing body 14, for example, powdered iron, but a different material may be used, if desired, so long as it will withstand the sintering temperature. The sintering temperature selected must obviously be above the melting point and below the vaporization point of the spacing particles 22 but below the melting points of the bearing body particles 23 and cellular structure particles 24 in order that only the spacing particles 22 will melt during the sintering operation. The amount of the infiltratable metal and non-infiltratable metal used necessarily depends on the size of oil well and coarseness of cellular structure to be produced, and varies with these factors.

In preparing the core 21, the infiltratable and non-infiltratable metal particles 22 and 24 are placed in a suitable container and shaken or otherwise thoroughly mixed together. The proportions of the cellular structure particles 24 to the spacing particles 22 are not critical. Enough of the cellular structure particles 24 shoud be used to cause the particles to touch and adhere to one another during sintering so that after sintering there remains a coarsely-porous self-sustaining cellular structure of sponge-like appearance rather than a loose powder which would rattle around in the chamber. The spacing particles 22 are chosen merely in sufficient quantities to temporarily fill the interstices between the cellular structure particles 24 until sintering is performed. From Figures 7 and 8, it will be self-evident that a mixture of infiltratable and non-infiltratable metal particles in approximately equal proportions will be satisfactory because the non-infiltratable metal particles must touch one another in order to form a continuous honeycomb or sponge-appearing structure when sintered (Figure 8), yet must have a sufficient volume of empty space between them in the form of interstices in order to provide a sufficient lubricant capacity. The use of a greatly excessive proportion of infiltratable particles would therefore leave the non-infiltratable (iron) particles completely separated from one another so that they would fall down in a powder or would not fill the chamber after sintering, whereas the use of a greatly excessive proportion of non-infiltratable particles would give an inadequate void volume and therefore an inadequate capacity for the lubricant. For these reasons, a mixture in approximately equal proportions of the infiltratable and non-infiltratable metal particles has been found successful in actual practice. The mixture is then molded to the desired shape of core in a conventional molding press, the shape of the core being made the shape which is desired for the reservoir or lubricant chamber 13 in the finished bearing or other permeable article 10. Thus, the outer and inner surfaces 25 and 26 respectively (Figure 2) of the core 21 will determine the positions of the outer and inner surfaces 17 and 18 of the reservoir or chamber 13, in the finished bearing. The granular structure of the core, before sintering, is shown in Figure 7, the sizes of the particles being exaggerated for clarity of showing.

The composite core 21, thus formed, is now placed in the die cavity of a suitable molding press, and placed at the desired level in the cavity at which it is desired to locate the reservoir 13, after making due allowance for the compression of the charge consisting of the metal particles 23 forming the bearing wall 14.

Such a molding press and charging device for inserting the powdered metal particles in the die cavity are disclosed and claimed in the co-pending application of John Haller, Serial No. 780,851 filed October 20, 1947 for "Briquetting Machine," which on September 2, 1952 became U. S. Patent 2,608,826. The procedure of locating the mold in the die cavity is shown in the co-pending application of John Haller, Serial No. 70,056, filed January 10, 1949, for "Powdered Metal Article and Process of Making the Same." In this press, the die cavity is provided with oppositely-movable plungers which compress the powdered material between them and thus obtain a higher density by reducing the frictional drag of the powdered material while it is being compressed. For short articles, however, a conventional single plunger press may be used.

The metal particles 23 are placed in the die cavity in such a manner as to surround the core 21, such as, for example, by first placing a layer of metal particles 23 in the bottom of the cavity, to the desired height or thickness, then placing the core on top of this layer, and finally filling in the space in and around the core 21 to the top of the die cavity or to a predetermined level within the die cavity.

When the die cavity of the molding press has been filled with the powdered metal particles 23, with the core 21 embedded therein, the plunger or plungers of the press are advanced into the die cavity to compress the charge to form an assembly, generally designated 27 (Figures 3 and 4). The compression applied depends upon the desired degree of porosity or density for the finished article, and also depends on the pressure necessary to force the metal powder or particles 23 into the various recesses of the core 21. A pressure of 25 to 30 tons is found suitable for small articles of this character. The upper plunger is then retracted and the lower plunger advanced until the assembly 27 is ejected from the die cavity.

The assembly 27 consisting of the core 21 embedded in a body 28 of unsintered metal particles, such as powdered iron, is now placed in a sintering oven and subjected to a suitable sintering heat treatment. The temperature and duration of the sintering operation depends on the nature of the particular article being made. For a small powdered iron article with a powdered iron honeycomb oil well structure, such as that shown in Figures 1 to 7 inclusive and employing spacing particles of the copper-zinc alloy set forth above, a sintering period of one half hour at 2020° F. has been found satisfactory. The sintering time and temperature is carefully regulated to avoid the undesirable granular structure set up in the metal when too long or too high a temperature is used. This condition and its avoidance are a part of the information possessed by engineers skilled in the art of powder metallurgy generally and is not a condition peculiar to the present invention. Such information is found in standard textbooks on powder metallurgy such as "Treatise on Powder Metallurgy," by Claus G. Goetzel, published in three volumes in 1949 by Interscience. When the sintering operation has been completed, the sintered article is then cooled under atmospheric-controlled conditions down to room temperature, whereupon it is removed.

The sintering operation not only increases the hardness of the body 14 of the bearing 10 formed by the foregoing operations, but also causes the infiltratable particles 22 to melt and infiltrate into the pores of the metal particles 23 of which the body 14 is composed. The action takes place by reason of capillary attraction, leaving a cellular structure generally designated 29 in the chamber 13, and shown in Figure 8, the sizes of the particles being somewhat exaggereated for clarity of showing. The cellular structure 29 is composed of the non-infiltratable particles 24 which are separated from one another by the tiny empty spaces vacated by the infiltratable metal particles 22. The space within the chamber 13 is thus broken up into a large number of tiny spaces, hence the formation of a large air space and the subsequent formation of a large air bubble is effectively prevented.

To fill the reservoir 13 with a lubricant, such as a lubricating oil, the bearing 10 may be placed in a hot oil bath for a sufficiently long time, such as 20 or 30 minutes, and preferably boiled until all of the air bubbles out through the pores of the bearing wall 14. The heated bearing 10 is then transferred quickly to a bath of cold luribacting oil. The cooling of the bearing sets up a vacuum in the pores of the bearing and also in the larger pores 30 of the lubricant reservoir 13. This vacuum, aided by capillary attraction, sucks the oil into the cellular structure 29 within the bearing body 14 through the pores thereof, and fills not only the pores of the bearing wall 14 but also the pores 30 of the cellular structure 29. This cellular structure completely prevents the formation of large air bubbles which frequently interfere with the filling of a reservoir or chamber lacking such a cellular or honeycomb structure.

As an alternate method of filling the bearing 10 with oil, it may be placed in an oil bath in a vacuum tank which is then evacuated. This draws the air out through the pores of the bearing wall 14 and evacuates the interior thereof, including the pores or spaces 30 of the cellular reservoir structure 29. When the air is again admitted to the vacuum tank, the lubricating oil is forced through the pores of the bearing wall or body 14 into the spaces or interstices 30 between the particles 24 forming the ceilular reservoir structure 29. By either method of filling, the pores of the bearing wall 14 and the spaces 30 within the cellular reservoir structure are filled with lubricating oil.

The modified permeable article, generally designated 40 (Figure 9) is formed by a similar process and is shown in the form of a filter for filtering liquids or gases. The permeable article 40 consists of a tubular body 41 of powdered material, such as powdered iron, containing an annular recess 42 in which a filter body or barrier 43 is mounted by the process of manufacturing the article. In order to connect the body 41 to inlet and outlet pipes 44 and 45 respectively, the body 41 may be provided with tapered inlet and outlet ports or passageways 46 and 47 respectively, these being preferably threaded to receive the correspondingly threaded ends 48 and 49 of the pipes 44 and 45.

In making the permeable article 40, a core for the filter body or barrier 43 is prepared in the same manner as the preparation of the core 21 previously described. Particles of infiltratable material, such as the copper-zinc alloy previously mentioned, and of a size suitable to provide the desired porosity in the barrier 43 are thoroughly mixed with particles of non-infiltratable material, such as powdered iron, these being likewise preferably coarser than the particles of which the body 41 is composed. The core is then compressed in the previously described manner and placed in the mold or die cavity, surrounded by the powdered metal, such as powdered iron, and compressed according to the above-described procedure. The article is then removed from the press and placed in a sintering oven where it is subjected to a suitable sintering temperature of sufficient duration, as described above. During the sintering operation, the infiltratable particles of the barrier 43 disappear by infiltration into the pores of the body 41, leaving a coarse cellular structure in the barrier 43. The permeable article 40 is used as a filter in the usual way. It may also be used as a dashpot for providing a controlled leakage of a gas or liquid, such dashpots being used in many mechanical devices such as shock absorbers.

The modified permeable article 50 shown in Figure 10 is generally similar to the permeable article 40 shown in Figure 9 and is formed in a similar manner. In Figure 10, however, the body 51 is elongated and provided with an elongated internal chamber 52 in which the cellular structure 53 is located. The cellular structure 53 is formed, as before, by preparing a core from a mixture of coarse particles of infiltratable and non-infiltratable material, such as the copper-zinc alloy previously mentioned.

The article is then compressed in a mold with the core inside the powdered metal, such as powdered iron, in the manner previously described, and is then sintered, also in the previously described manner. During the sintering operation, the infiltratable metal particles disappear into the pores of the body 51, leaving the filter body or barrier 53 of a porosity governed by the sizes of the particles of infiltratable material of which the core was partially composed.

What I claim is:

1. A process of making a liquid permeable powdered metal article of manufacture comprising mixing particles of a metal which is infiltratable into the metal of which the powdered metal article is to be made, in approximately equal proportions with particles of a metal which is non-infiltratable into the metal of which the powdered metal article is to be made to form a composite powdered metal mixture, molding said composite powdered metal mixture into a core with the non-infiltratable metal particles disposed in close proximity to one another, embedding said core in a mass of finer-grained powdered metal than the powdered metal mixture of said core, compressing said mass to form a semi-finished body and core assembly, and sintering said assembly to infiltrate the infiltratable core metal into said body and to cause the non-infiltratable metal particles of the core to engage and adhere to one another whereby to provide a chamber in said body having a permeable cellular structure of non-infiltratable metal therein having a sponge-like appearance.

2. A process of making a porous powdered metal article consisting of a bearing with a lubricant reservoir therein, comprising mixing particles of a metal which is infiltratable into the metal of which the powdered metal article is to be made, in approximately equal proportions with particles of a metal which is non-infiltratable into the metal of which the powdered metal article is to be made to form a composite powdered metal mixture, molding said composite powdered metal mixture into a core with the non-infiltratable metal particles disposed in close proximity to one another, embedding said core in a mass of finer-grained powdered metal than the powdered metal mixture of said core, compressing said mass to form a semi-finished body and core assembly with a bearing surface thereon, and sintering said assembly to infiltrate the infiltratable core metal into said body and to cause the non-infiltratable metal particles of the core to engage and adhere to one another whereby to provide a lubricant reservoir therein with a cellular lubricant-holding structure of non-infiltratable metal in said reservoir having a sponge-like appearance.

3. A process of making a liquid-permeable powdered metal article comprising mixing particles of a metal which is infiltratable into the metal of which the powdered metal article is to be made, with particles of a metal which is non-infiltratable into the metal of which the powdered metal article is to be made to form a composite powdered metal mixture, molding said composite powdered metal mixture into a core with the non-infiltratable metal particles disposed in close proximity to one another, at least partially embedding said core in a mass of finer-grained powdered metal than the powdered metal mixture of said core, compressing said mass to form a semi-finished body and core assembly with a passageway leading to and from said core, and sintering said assembly to infiltrate the infiltratable core metal into said body and to cause the non-infiltratable metal particles of the core to engage and adhere to one another whereby to provide a body with a passageway therethrough having a fluid permeable barrier thereacross of non-infiltratable metal having a sponge-like appearance.

4. A process of making a liquid-permeable powdered metal article comprising mixing particles of a metal which is infiltratable into the metal of which the powdered metal article is to be made, with particles of a metal which is non-infiltratable into the metal of which the powdered metal article is to be made to form a composite powdered metal mixture, molding said composite powdered metal mixture into a core with the non-infiltratable metal particles disposed in close proximity to one another, at least partially embedding said core in a mass of finer-grained powdered metal than the powdered metal mixture of said core, compressing said mass to form a semi-finished body and core assembly forming a passageway in said body leading to and from said core, and sintering said assembly to infiltrate the infiltratable core metal into said body and to cause the non-infiltratable metal particles of the core to engage and adhere to one another whereby to provide a body with a passageway therethrough having a fluid-permeable barrier thereacross of non-infiltratable metal having a sponge-like appearance.

References Cited in the file of this patent

UNITED STATES PATENTS

| Number | Name | Date |
|---|---|---|
| 2,180,988 | Lemmers et al. | Nov. 21, 1939 |
| 2,227,308 | Hildabolt | Dec. 31, 1940 |
| 2,401,221 | Bourne | May 28, 1946 |
| 2,402,950 | Culver et al. | July 2, 1946 |
| 2,561,579 | Lenel | July 24, 1951 |

FOREIGN PATENTS

| Number | Country | Date |
|---|---|---|
| 452,503 | Great Britain | Aug. 17, 1936 |
| 573,740 | Great Britain | Dec. 4, 1945 |
| 611,466 | Great Britain | Oct. 29, 1948 |